United States Patent
Kuo

(10) Patent No.: US 8,225,028 B2
(45) Date of Patent: Jul. 17, 2012

(54) MEMORY DEVICES AND METHODS FOR PROGRAMMING FLASH MEMORY UTILIZING SPARE BLOCKS

(75) Inventor: Wu-Chi Kuo, Kaoshiung (TW)

(73) Assignee: Silicon Motion, Inc., Jhubei (TW)

( * ) Notice: Subject to any disclaimer, the term of this patent is extended or adjusted under 35 U.S.C. 154(b) by 569 days.

(21) Appl. No.: 12/404,321

(22) Filed: Mar. 15, 2009

(65) Prior Publication Data

US 2010/0106892 A1    Apr. 29, 2010

(30) Foreign Application Priority Data

Oct. 28, 2008    (TW) ................................ 97141345 A

(51) Int. Cl.
*G06F 13/20*    (2006.01)
(52) U.S. Cl. .................... 711/103; 711/167; 711/168
(58) Field of Classification Search ................ None
See application file for complete search history.

(56) References Cited

U.S. PATENT DOCUMENTS

2007/0033363 A1* 2/2007 Li et al. ................ 711/167
2008/0270680 A1* 10/2008 Chang ................... 711/103
2009/0089492 A1* 4/2009 Yoon et al. ............ 711/103
2009/0157947 A1* 6/2009 Lin et al. ............... 711/103

FOREIGN PATENT DOCUMENTS

| CN | 1485860 A | 3/2004 |
|---|---|---|
| CN | 1567476 A | 1/2005 |

OTHER PUBLICATIONS

Office Action of corresponding China patent application mailed on Mar. 7, 2011.
English translation of CN1485860-A, Mar. 31, 2004.
English translation of CN1567476-A, Jan. 19, 2005.

* cited by examiner

*Primary Examiner* — Than Nguyen
(74) *Attorney, Agent, or Firm* — Wang Law Firm, Inc.; Li K. Wang

(57) ABSTRACT

An access method for use in a memory device is provided. The memory device comprises a data area having a plurality of data blocks and a spare area having a plurality of spare blocks. First, data from a host is received. A spare block is popped from the spare area and the received data is programmed into the popped spare block accordingly. A data block corresponding to the data is pushed to the spare area. The pushed data block is erased when the memory device is waiting for a specific instruction to be issued from the host.

20 Claims, 6 Drawing Sheets

MEMORY DEVICES AND METHODS FOR PROGRAMMING FLASH MEMORY UTILIZING SPARE BLOCKS

CROSS REFERENCE TO RELATED APPLICATIONS

This Application claims priority of Taiwan Patent Application No. 097141345, filed on Oct. 28, 2008, the entirety of which is incorporated by reference herein.

BACKGROUND OF THE INVENTION

1. Field of the Invention

The disclosure relates generally to data access methods for memory devices, and, more particularly to data access methods capable of improving access performance of the memory devices.

2. Description of the Related Art

In general, memory devices, such as memory cards or USB flash drives with a flash memory, comprise a control unit and a flash memory in which the flash memory is used for storing data. The flash memory can be is used in an embedded system, a personal digital assist (PDA), a portable computer, a digital audio player, a digital camera and a mobile phone. The flash memory is one kind of non-volatile memory that can be erased electrically and can be re-programmed, and it is mainly implemented in memory cards or USB flash drives for storing data and transmitting data between computer systems and the digital products.

A flash memory may comprise multiple memory blocks and each memory block has multiple storing pages for storing data. Flash memories erase data in one memory block unit and program data in one storing page unit. Further, data can only be programmed to a storing page that does not contain data or an erased storing page. Thus, when data is to be programmed to a specific storing page of a memory block of the flash memory, data contained in the specific storing page must be erased first. And, when data within the flash memory has been erased, all storing pages of that memory block of the flash memory must also be erased at the same time.

However, each time a data erasing operation of the flash memory is completed, the control unit needs a waiting time period (e.g. 3 microseconds), to wait for the host to be ready. Thus, the next data erasing operation may only be performed after the waiting time period is completed, thereby reducing the performance of the memory device.

BRIEF SUMMARY OF THE INVENTION

Memory devices and related access methods are provided.

In an embodiment, an access method for use in a memory device is provided. The memory device comprises a data area having a plurality of data blocks and a spare area having a plurality of spare blocks. First, data from a host is received. A spare block is popped from the spare area and the received data is programmed into the popped spare block accordingly. A data block corresponding to the data is pushed to the spare area. The pushed data block is erased when the memory device is waiting for a specific instruction to be issued from the host.

An embodiment of a memory device comprises a non-volatile memory and a control unit. The non-volatile memory comprises a data area having a plurality of data blocks and a spare area having a plurality of spare blocks. The control unit receives data from a host, pops a spare block from the spare area, programs the received data into the popped spare block, pushes a data block corresponding to the received data to the spare area, and erases the pushed data block when the memory device is waiting for a specific instruction to be issued from the host.

In an embodiment, another access method for use in a memory device is further provided. The memory device comprises a non-volatile memory and the non-volatile memory has a data area having a plurality of data blocks and a spare area having a plurality of spare blocks. The method comprises the following steps. First, data is programmed into a spare block, wherein the spare block is popped from the spare area. Thereafter, a data block corresponding to the data is marked and the marked data block is pushed to the spare area. During a first time period on which the memory device is waiting to receive an instruction, at least one marked data block of the spare area is erased.

Access methods for memory devices and memory devices thereof may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention is described with reference to FIGS. 1 through 5D, which generally relates to data access methods for memory devices. In the following detailed description, reference is made to the accompanying drawings which from a part hereof, shown by way of illustration of specific embodiments. The embodiments are described in sufficient detail to enable those skilled in the art to practice the invention, and it is to be understood that other embodiments may be utilized and that structural, logical and electrical changes may be made, without departing from the spirit and scope of the invention. The following detailed description is, therefore, not to be taken in a limiting sense. It should be understood that many of the elements described and illustrated throughout the specification are functional in nature and may be embodied in one or more physical entities or may take other forms beyond those described or depicted.

Figure 1:
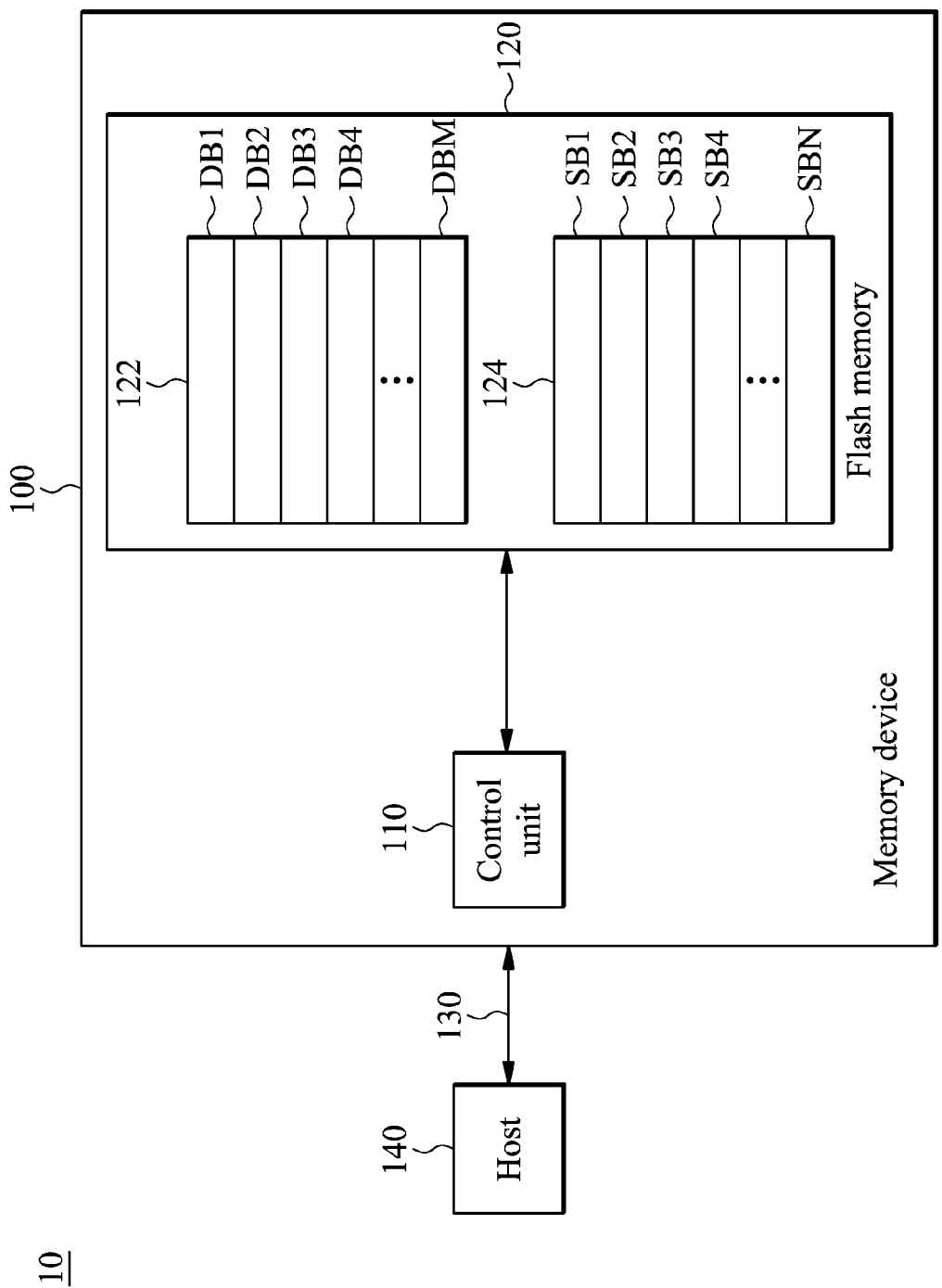
FIG. 1 is a schematic diagram illustrating an embodiment of a computer system of the invention.

FIG. 1 is a schematic diagram illustrating an embodiment of a computer system of the invention. As shown in FIG. 1A, computer system 10 comprises at least one memory device 100 and a host 140, wherein the memory device 100 receives instructions or data issued from the host 140 or transmits data or messages to the host 140 via a connection interface 130. The memory device 100 at least comprises a control unit 110 and a non-volatile memory unit such as a flash memory 120. The non-volatile memory unit may be, for example, a non-volatile NAND-type flash, but it is not limited thereto. The flash memory 120 has a data area 122 and a spare area 124. The data area comprises M data blocks, DB1-DBM, having data stored therein and the spare area comprises N spare blocks, SB1-SBN, in which M and N are integers larger than zero and M and N may be set to the same value or may be set to different values. Moreover, the spare blocks SB1-SBN can be directly programmed while the data blocks having data stored therein DB1-DBM can only be programmed after they have been erased.

Figure 2:
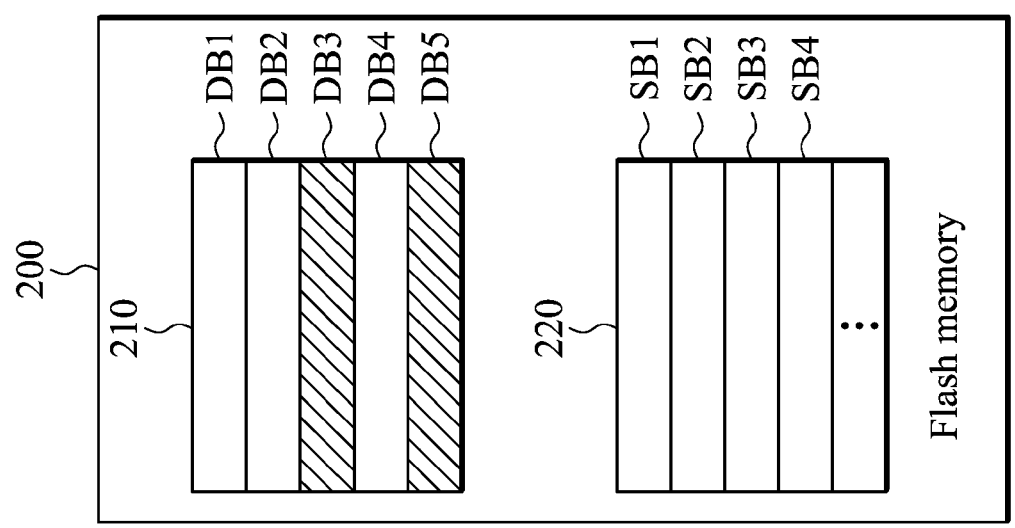
FIG. 2 is a schematic diagram illustrating an embodiment of a flash memory of the invention.

FIG. 2 is a schematic diagrams illustrating an embodiment of a flash memory of the invention. As shown in FIG. 2, the flash memory 200 has a data area 210 and a spare area 220, wherein the data area 210 comprises 5 data blocks having data stored therein DB1-DB5 and the spare area 220 comprises 4 spare blocks SB1-SB4. As shown, a spare block that is on the top of the spare area 220 (i.e. SB1) is referred to as the top spare block while an area that is under the bottom spare block of the spare area 220 (i.e. SB4) is referred to as the bottom of the spare area 220. In this embodiment, a step of popping a spare block from the spare area is performed by popping the top spare block of the spare area while a step of pushing a data block corresponding to the received data to the spare area is performed by pushing the data block to the bottom of the spare area. After one data block has been erased, the erased data block may be re-configured to a spare block to be used as a new spare block.

The control unit 110 may perform a computer program or firmware for performing a data access method and controlling data access of the flash memory 120 so as to improve access performance of the memory device 100. The control unit 110 may receive data from the host 140 and then pop a spare block from the spare area 124, program the received data into the popped spare block, and thereafter, push a data block corresponding to the received data to the spare area 124 and erase content within the pushed data block when waiting for a specific instruction to be issued from the host 140. It is noted that, the host 140 may issue or send an instruction related to access/read-write of the memory device such as instructions for reading or writing the flash memory 120 and may issue or send an instruction unrelated to access/read-write of the memory device such as a first instruction Test_unit_ready instruction, a read capacity instruction, read format capacity instruction or the like to the memory device 100. For example, the first instruction Test_unit_ready is used by the host 140 to test whether the memory device 100 is present in the computer system 10. Typically, after the data to be programmed has been sent for a while, the host 140 will issue a Test_unit_ready instruction for testing the memory device 100. The instructions are used to inspect whether the memory device is ready or to obtain current status of the memory device, which are unrelated to the programming of the flash memory. In this embodiment, the specific instruction is an instruction unrelated to access/read-write of the memory device 120.

Figure 3:
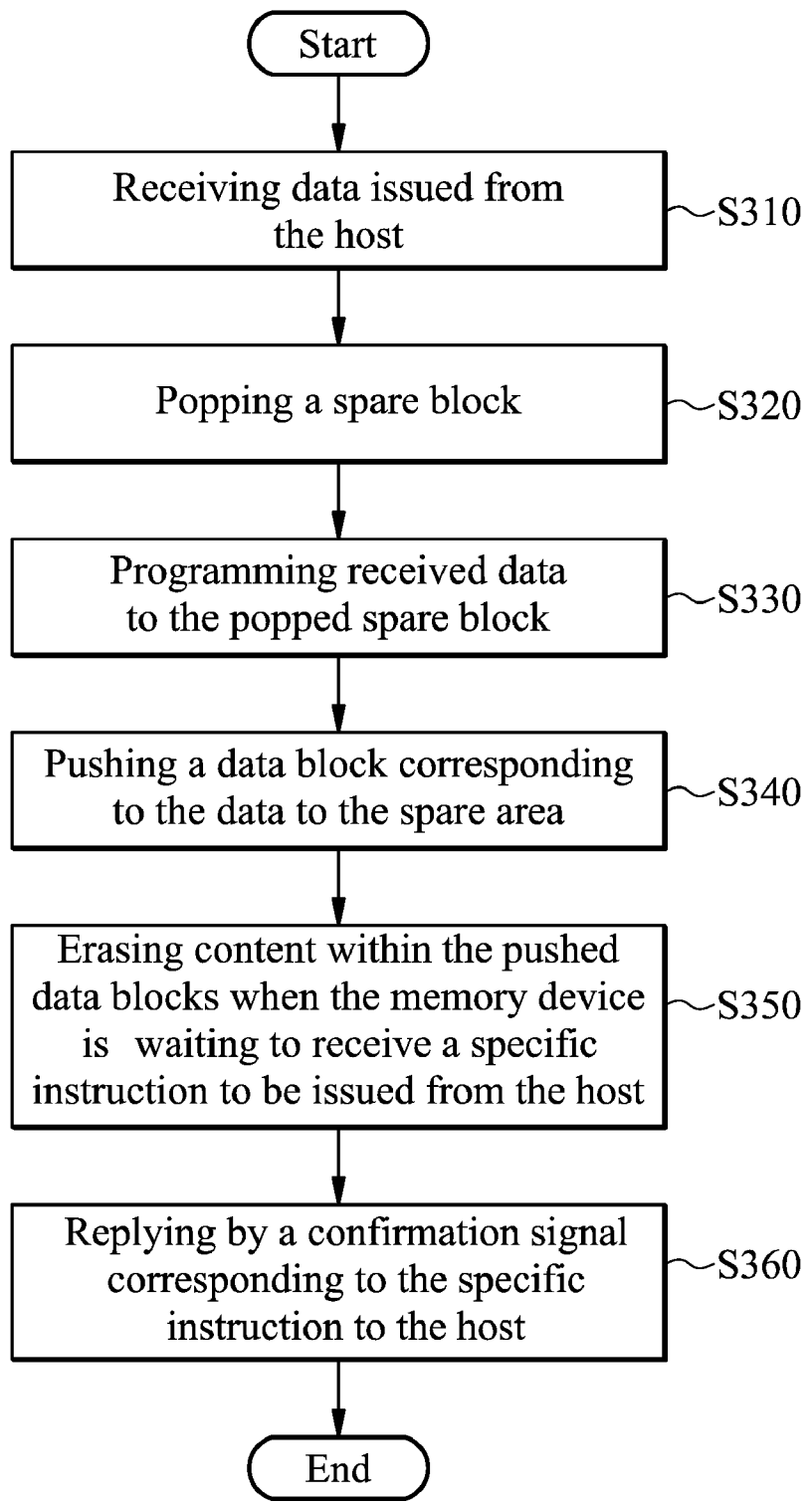
FIG. 3 is a flowchart of an embodiment of an access method for use in a memory device of the invention.

FIG. 3 is a flowchart of an embodiment of an access method for use in a memory device of the invention. The access method can be stored in a computer program and can be performed by the control unit 110 of the memory device 100 shown in FIG. 1.

First, when the host 140 attempts to program data into the flash memory 120, it sends data to be programmed to the memory device 120 via an instruction related to access/read-write of the memory device.

In step S310, the control unit 110 of the memory device 100 receives data issued from the host 140.

Thereafter, in step S320, the control unit 110 performs a programming procedure to pop a spare block from the spare area 124 so as to program the new data received from the host 140 to the flash memory 120. Note that the step of popping the spare block from the spare area 124 is performed by popping the top spare block of the spare area 124. For example, the control unit 110 may pop the top spare block that is on the top of the spare area 220 (i.e. SB1) as a spare block to program (or store) the data.

In step S330, the control unit 110 programs the received data to the popped spare block. In this step, the control unit 110 will program (write) the data that is from the host and is corresponding to the first data block to the popped spare block.

In step S340, the control unit 110 pushes the first data block corresponding to the data to the spare area. For example, the step of pushing the data block to the spare area may be performed by pushing the data block to the bottom of the spare area 124.

In step S350, when the memory device 100 is waiting to receive a specific instruction to be issued from the host 140, operation for erasing the data blocks will be performed to erase content within the pushed data blocks. In this step, the control unit 110 may erase a used block from the spare area and configure the erased data block as a spare block after the data block has been erased.

Next, in step S360, when receiving the specific instruction which is issued from the host 140, the control unit 110 replies by a confirmation signal corresponding to the specific instruction to the host 140 for informing that the memory device 100 is present. For example, if the instruction to be issued from the host 140 is a check instruction, the control unit 110 may reply to a confirmation signal corresponding to the check instruction to the host 140 for informing the memory device 100 that the memory device 100 is present.

According the embodiments of the invention, erasing operation of blocks remaining in the spare area and are to be erased can be performed when the control unit 110 is waiting for a specific instruction to be issued from the host, thereby significantly reducing the waiting time period needed and further improve the programming performance of the flash memory.

In another embodiment, the spare area may comprise more than one data block to be erased and the access method of the invention may also be applied to erase multiple data blocks at one time during a first time period, wherein the memory device waits to receive an instruction during the first time period.

Figure 4:
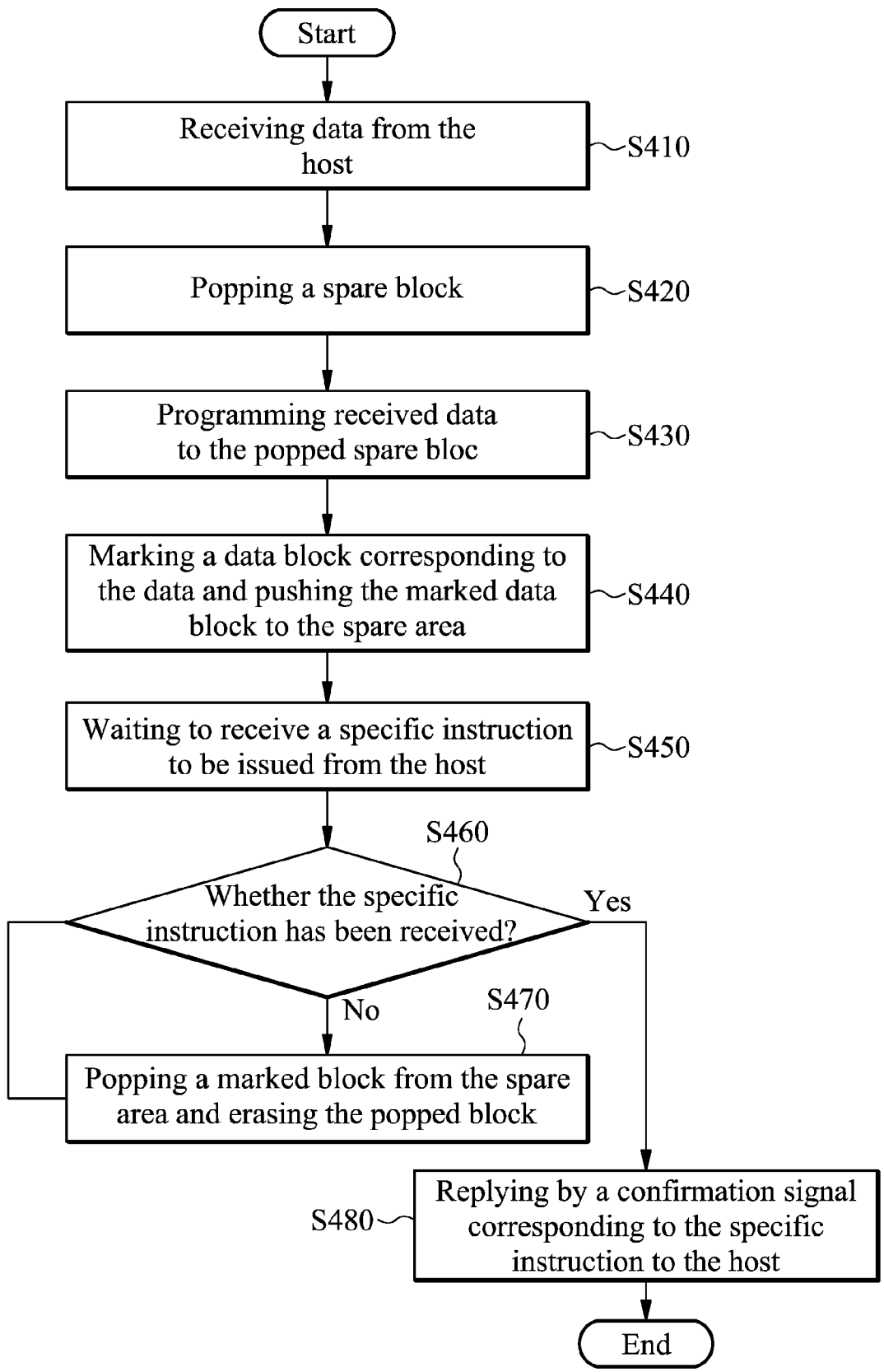
FIG. 4 is a flowchart of another embodiment of an access method for use in a memory device of the invention.

FIG. 4 is a flowchart of another embodiment of an access method for use in a memory device of the invention. The access method can be stored in a computer program and can be performed by the control unit 110 of the memory device 100 shown in FIG. 1.

Similarly, in step S410, when the host 140 attempts to program data into the fish memory 120, it sends data to be programmed to the memory device 120 via an instruction related to the access/read-write of the memory device so that the control unit 110 of the memory device 100 receives data from the host 140.

Thereafter, in step S420, the control unit 110 performs a programming procedure to pop a spare block from the spare area 124 so as to program the new data received from the host 140 to the flash memory 120. For example, the step of popping the spare block from the spare area 124 may be performed by popping the top spare block of the spare area 124, but it is not limited thereto.

In step S430, the control unit 110 programs the received data to the popped spare block. Then, in step S440, a data block corresponding to the data is marked and the marked data block is pushed to the spare area. For example, the step of pushing the data block to the spare area may be performed by pushing the data block to the bottom of the spare area 124.

In step S440, the control unit 110 programs the data that is from the host and is corresponding to a first data block to the popped spare block and links the physical address of the popped spare block to a first physical address that corresponds to the first data block.

In step S450, the memory device 100 is waiting to receive a specific instruction to be issued from the host 140 and in step S460, determines whether the specific instruction has been received. It is to be noted that, a time period that the memory device 100 must wait before receiving a specific instruction to be issued from the host 140, wherein the specific instruction has not been received, is referred to as a waiting cycle.

If no specific instruction (e.g. the Test_unit_ready instruction) has been received in step S460, step S470 is performed such that the control unit 110 will pop a marked block from the spare area 124 to perform a block erasing operation and then step S460 is repeated to inspect whether the specific instruction has been received. If no specific instruction has been received yet, step S470 is again performed such that the control unit 110 will pop another marked block from the spare area 124 to perform a block erasing operation. Steps 460 and 170 will be repeated until the specific instruction has been received. When receiving the specific instruction which is issued from the host 140 (Yes in step S460), in step S480, the control unit 110 replies by a confirmation signal corresponding to the specific instruction to the host 140 for informing the host 140 that the memory device 100 is present.

For example, please refer to FIGS. 5A to 5D which are used for illustrating operational detail of the data access method according to an embodiment of the invention.

Figure 5B:
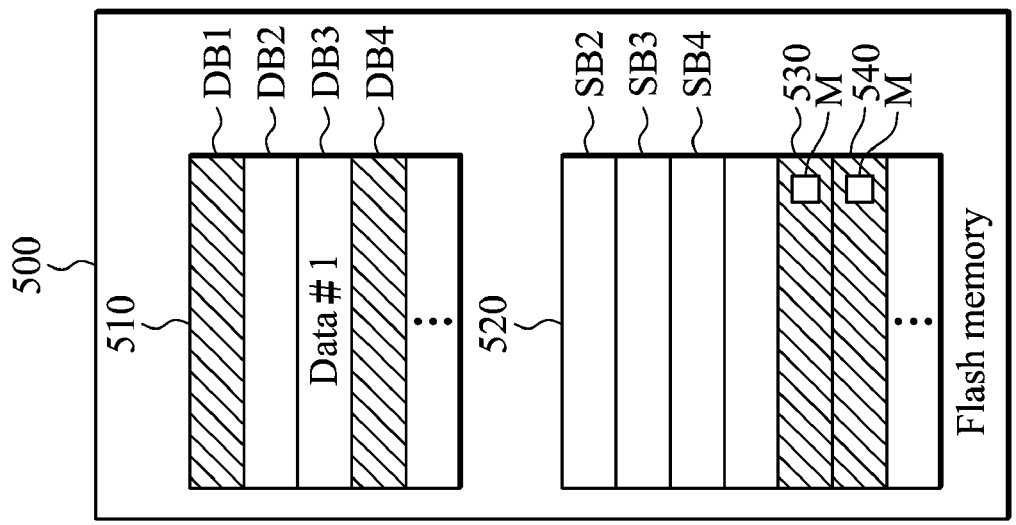
FIGS. 5A-5D are schematic diagrams illustrating embodiments of data access methods of the invention.
Figure 5A:
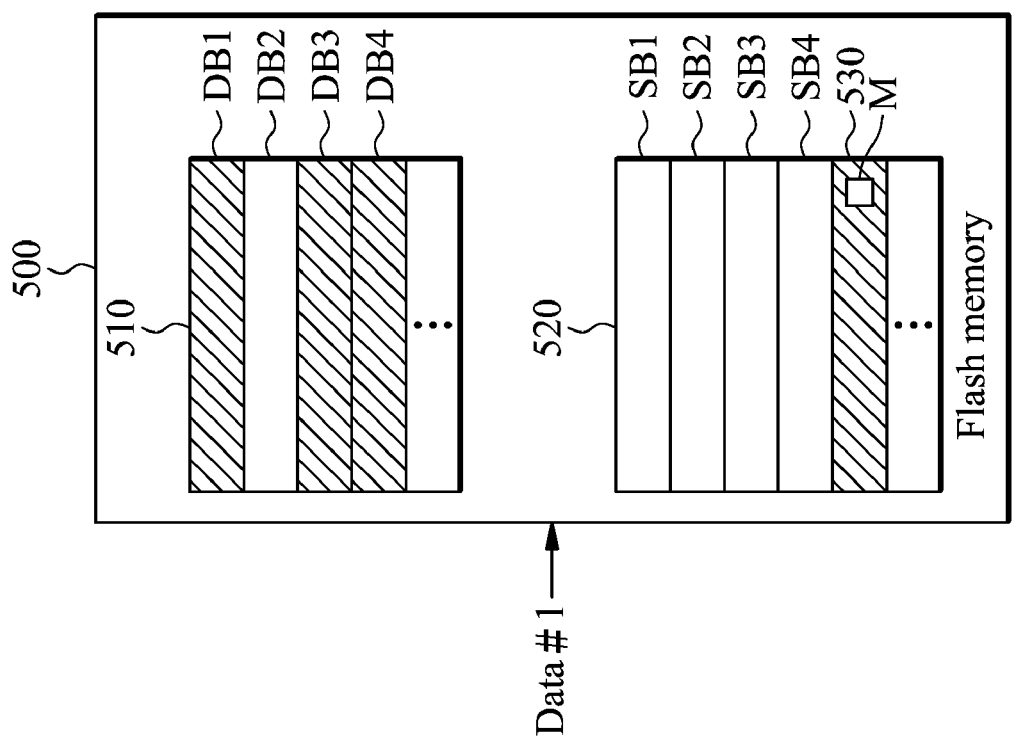

FIGS. 5A to 5D are schematic diagrams illustrating embodiments of data access methods of the invention. As shown in FIG. 5A, a flash memory 500 has a data area 510 and a spare area 520, wherein the data area 510 comprises at least 4 data blocks DB1-DB4 and the spare area 520 comprises at least 4 spare blocks SB1-SB4 and a marked block 530 having a mark M for representing that the block is needed to be erased. In this embodiment, it is assumed that data blocks DB1, DB3 and DB4 are used blocks, i.e. each of the data blocks has data stored therein. When receiving a programming instruction from the host and prepares to program data #1 to the data block DB3, due to the data block DB3 being a used block, the control unit 110 pops a spare block (e.g. the top spare block SB1) from the spare area 520 and programs the data #1 to the popped spare block SB1. Thereafter, a mark M is added to the original data block DB3 to represent that the data block DB3 is a data block needed to be erased and the marked data block is pushed back to the spare area such as pushing the data block to the bottom of the spare area (i.e. an area under the marked block 530), as the marked block 540 shown in FIG. 5B. Meanwhile, the control unit may perform a data rearrangement operation to remap the address of the spare block SB1 and the data block DB3.

Figure 5D:
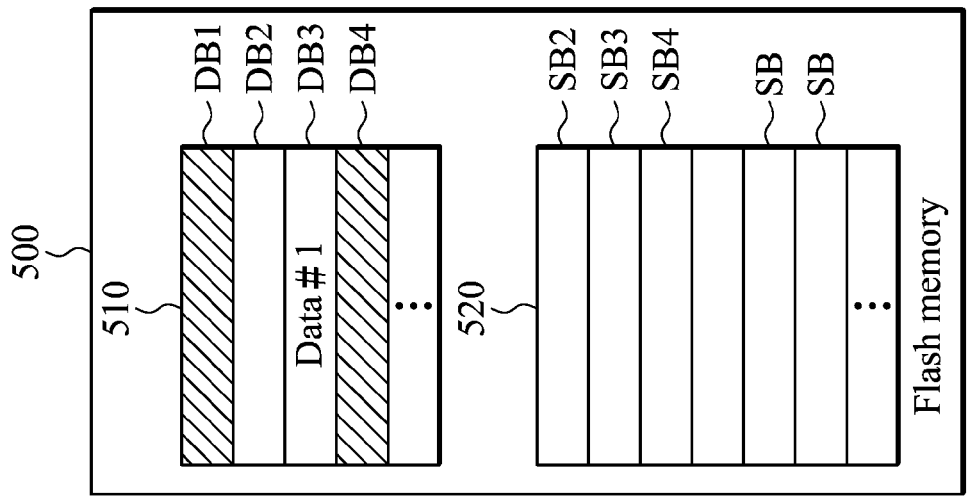
Figure 5C:
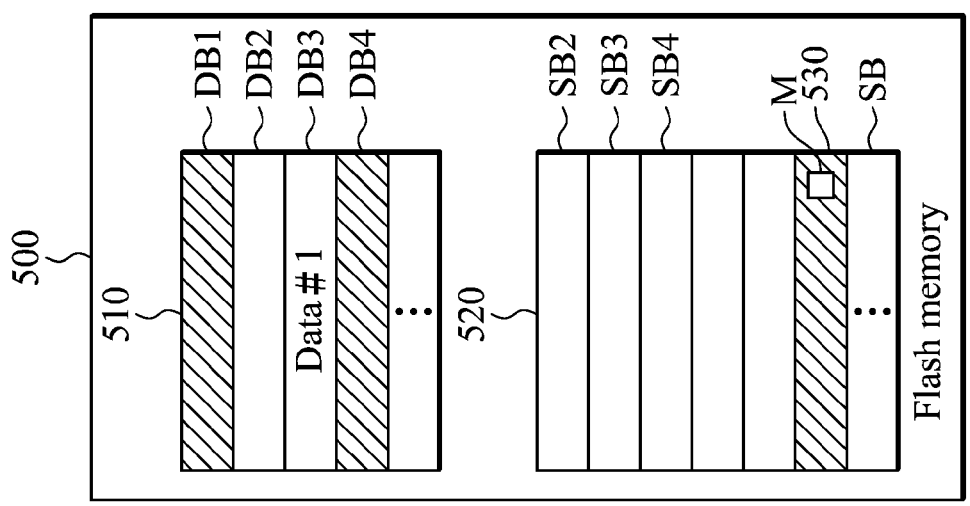

After the data rearrangement operation has been completed, the control unit will wait to receive a specific instruction from the host. During a first time period when the memory device is waiting to receive an instruction, the control unit will continually determine whether the specific instruction has been received or not, and if not, pop a marked block from the spare area and erase the popped block. For example, the marked block which is the latest pushed block in the spare area, has a higher priority to be erased, i.e. the marked block nearest to the bottom of the spare area will be erased first, but it is not limited thereto. Thus, the marked block 540 will be erased first and after the marked block 540 has been erased, the block 540 will be re-configured as an available spare block SB for subsequent use, as shown in FIG. 5C. After the marked block 540 has been erased, again, it is determined whether the specific instruction has been received. Similarly, if it is found that the specific instruction has still not been received, another marked block will be popped from the spare area and the popped block will then be erased. Therefore, the marked block 530 will be erased and after the marked block 530 has been erased, the block 530 will be re-configured as an available spare block SB for subsequent use, as shown in FIG. 5D. If it is found that the specific instruction has been received, the control unit will reply by a confirmation signal corresponding to the specific instruction to the host so as to proceed with subsequent data accessing.

In summary, according to embodiments of memory devices and related access methods of the invention, the operation of block erasing can be performed during a wait cycle when the memory device is waiting to receive a specific instruction to be issued from the host and when the specific instruction has not be received so that one block or more than one blocks that are marked to be erased can be erased at the same period, thereby erasing not only the data block that was last pushed but also un-erased blocks that should be erased in the spare block. Therefore, waiting time period needed for erasing individual block can be reduced and overall access performance of the memory device can be improved.

Systems and method thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Certain term are used throughout the description and claims to refer to particular system components. As one skilled in the art will appreciate, consumer electronic equipment manufacturers may refer to a component by different names. This document does not intend to distinguish between components that differ in name but not function.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An access method for use in a memory device, wherein the memory device comprises a data area having a plurality of data blocks and a spare area having a plurality of spare blocks, comprising:
   receiving data from a host;
   popping a spare block from the spare area and programming the received data into the popped spare block;
   pushing a data block corresponding to the received data to the spare area; and
   erasing the pushed data block when the memory device is waiting for a specific instruction to be issued from the host.

2. The access method of claim 1, further comprising:
   replying by a confirmation signal corresponding to the specific instruction to the host when receiving the specific instruction to be issued from the host.

3. The access method of claim 1, wherein the step of popping a spare block from the spare area is performed by popping a top spare block of the spare area as the spare block.

4. The access method of claim 1, wherein the step of pushing a data block corresponding to the received data to the spare area is performed by pushing the data block to the bottom of the spare area.

5. The access method of claim 1, further comprising:
   configuring the erased data block to a spare block after the data block has been erased.

6. The access method of claim 1, wherein the specific instruction comprises a first instruction for testing whether the memory device is present.

7. The access method of claim 1, wherein the specific instruction is used for inspecting whether the memory device is ready.

8. The access method of claim 1, wherein the specific instruction is an instruction unrelated to access/read-write of the memory device.

9. A memory device, comprising:
   a non-volatile memory, comprising a data area having a plurality of data blocks and a spare area having a plurality of spare blocks; and
   a control unit, receiving data from a host, popping a spare block from the spare area, programming the received data into the popped spare block, pushing a data block corresponding to the received data to the spare area, and erasing the pushed data block when the memory device is waiting for a specific instruction to be issued from the host.

10. The memory device of claim 9, wherein the control unit further marks the data block as a block to be erased before the data block is pushed to the spare area.

11. The memory device of claim 9, wherein the control unit further replies by a confirmation signal corresponding to the specific instruction to the host when receiving the specific instruction to be issued from the host.

12. The memory device of claim 9, wherein the control unit pops a top spare block of the spare area as the spare block.

13. The memory device of claim 9, wherein the control unit further pushes the data block to the bottom of the spare area.

14. The memory device of claim 9, wherein the control unit further configures the erased data block to a spare block after the data block has been erased.

15. The memory device of claim 9, wherein the specific instruction comprises a first instruction for testing whether the memory device is present.

16. The memory device of claim 9, wherein the specific instruction is used for inspecting whether the memory device is ready.

17. The memory device of claim 9, wherein the specific instruction is an instruction unrelated to access/read-write of the memory device.

18. The memory device of claim 9, wherein the non-volatile memory is a NAND-type flash memory.

19. An access method for use in a memory device, wherein the memory device comprises a non-volatile memory and the non-volatile memory has a data area having a plurality of data blocks and a spare area having a plurality of spare blocks, comprising:
   programming data into a spare block, wherein the spare block is popped from the spare area;
   marking a data block corresponding to the data and pushing the marked data block to the spare area; and
   during a first time period on which the memory device is waiting to receive an instruction, erasing at least one marked data block of the spare area.

20. The access method of claim 19, wherein the instruction is an instruction unrelated to access/read-write of the memory device.

* * * * *